United States Patent [19]
Wehde

[11] 3,716,974
[45] Feb. 20, 1973

[54] HARVESTING ATTACHMENT FOR COMBINES

[76] Inventor: James F. Wehde, Garretson, S. Dak. 57030

[22] Filed: June 21, 1971

[21] Appl. No.: 154,867

[52] U.S. Cl. ................................. 56/14.3, 171/58
[51] Int. Cl. ............................................. A01d 45/02
[58] Field of Search ....171/58, 61; 56/94, 13.5, 14.1, 56/14.2, 14.3, 503, 119, 317, 51, 53, 56, 121.42, 121.45, 121.44

[56] References Cited

UNITED STATES PATENTS

| | | | |
|---|---|---|---|
| 2,949,717 | 8/1960 | Johannesen | 56/14.3 |
| 3,437,152 | 4/1969 | Barrentine | 171/58 |

Primary Examiner—Antonio F. Guida
Attorney—H. Dale Palmatier et al.

[57] ABSTRACT

A harvesting attachment for combines comprising at least one pair of gripping wheels pivotally supported on the front of the combine receiving platform above the combine cutting blade at an angularly inclined position with respect to the ground, the gripping wheels being in pressure contact with each other along a gripping area positioned in alignment with a row of crops, such as a sow beans, being harvested. The gripping wheels are so positioned with respect to the combine cutting blade and their angular inclination and rotational speed with respect to the ground speed of the combine are so adjusted that the wheels will grip and lift plant stalks a predetermined distance vertically and hold the stalks for cutting from their roots by the combine cutting blade prior to conveying the stalks rearwardly onto the combine receiving platform.

13 Claims, 5 Drawing Figures

PATENTED FEB 20 1973 3,716,974

INVENTOR.
James F. Wehde
BY
Williamson, Palmatier
& Bains ATTORNEYS

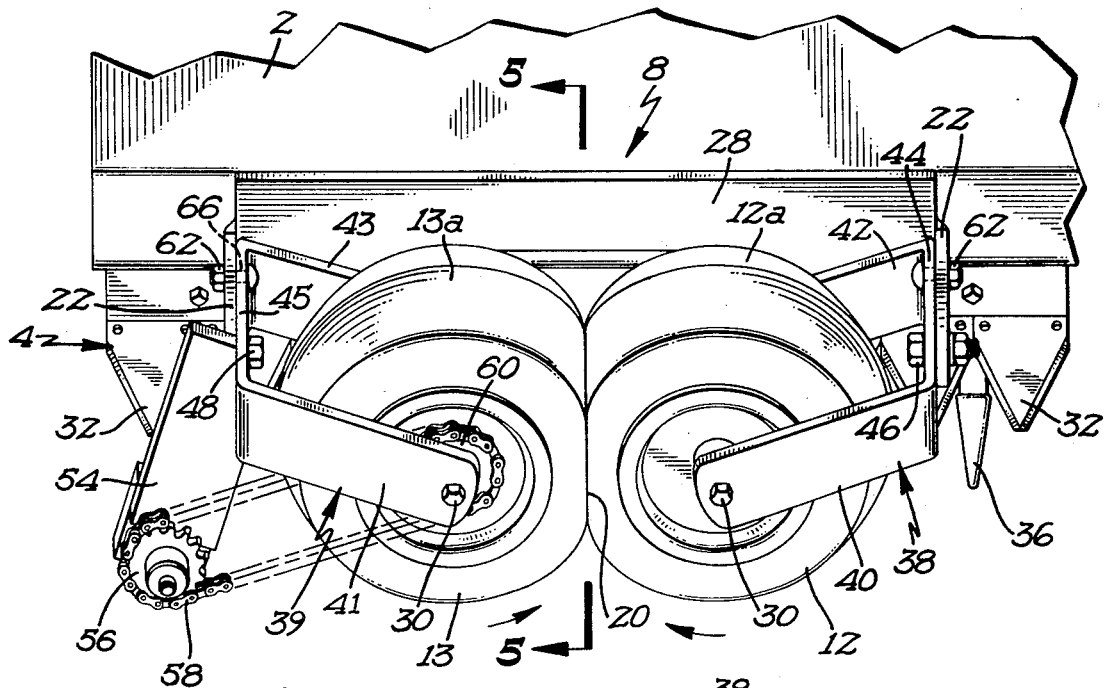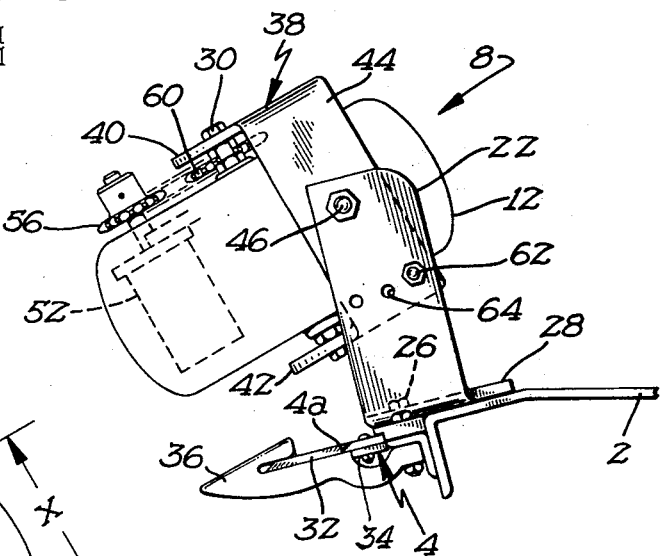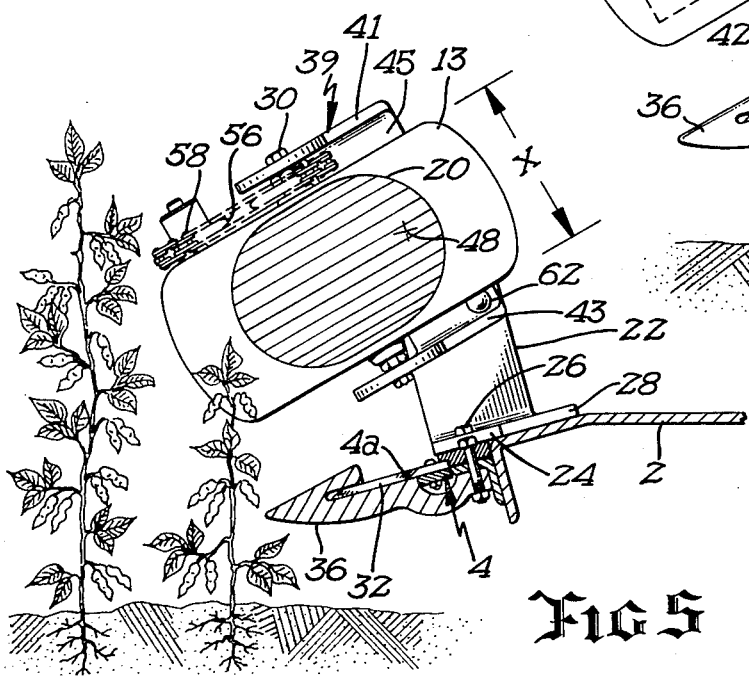

3,716,974

HARVESTING ATTACHMENT FOR COMBINES

BACKGROUND OF THE INVENTION

In the harvesting of certain types of row crops by combines, a serious, crop loss problem exists because of the difficulty in cutting and harvesting the pods or fruit bearing leaves of plants lying very close to or directly on the ground. The sickle or cutting blade on the front end of conventional combines can not be set closer than approximately 2 inches to the ground without striking rocks, low lying obstructions and irregular ground. Because of this necessary elevation of the combine cutting blade above ground level, all of those pods or fruit bearing leaves lying less than two inches above the ground are lost. This problem is particularly true and acute with respect to soy beans which normally have at least two or three bean pods lying close to the ground at elevations less than two inches. Because of this harvesting problem with respect to the low lying pods of soy beans plants, at least four to six bushels of soy beans are lost per acre harvested, which amounts to a tremendous annual loss of soy beans when the total soy bean acreage in the United States is considered.

Previous attempts to cope with this problem have been directed to the use of lower, more flexible cutting blades or sickles on combines and to lifting devices intended to raise the leaves of the soy bean plants as they are being harvested. These devices have been largely ineffectual. Accordingly, I have developed a harvesting attachment for combines which overcomes this problem by positively gripping and lifting plant stalks as they are being harvested so that the low lying bean pods will be held at such a level with respect to the combine cutting blade that they will be harvested.

BRIEF SUMMARY OF THE INVENTION

The harvesting attachment of this invention is particularly characterized by at least one pair of gripping wheels rotatably mounted on the front end of the receiving platform of a combine above the combine cutting blade in an angularly inclined position with respect to the ground with the forward ends of the wheels being lowermost and close to the ground, the wheels having yieldable peripheral surfaces in pressure contact with each other defining a contact and gripping area between the wheels in alignment with a row of crops being harvested, with the gripping area extending from a point in front of the cutting blade rearwardly over the blade. Drive means is connected to one of the gripping wheels for supplying rotary power thereto, and the wheels rotate together in opposite directions by reason of their frictional engagement so as to grip the stalks of plants therebetween at the forward end of the aforesaid gripping area and to exert an upward and rearward pulling force on stalks to convey them onto the combine receiving platform. The drive means for the gripping wheels is adjusted to rotate the wheels at a predetermined speed synchronized with the forward, ground speed of the combine on which the attachment is mounted so that the gripping wheels will impart a predetermined lift to a plant stalk and will operate to hold a lifted stalk at the rear of the gripping area over the combine cutting blade with the base of the stalk at a predetermined elevation with respect thereto just as the cutting blade reaches the stalk and severs it from its roots.

A particularly advantageous feature of my harvesting attachment resides in the pivotal mounting of the aforesaid gripping wheels on a combine receiving platform for pivotal movement about horizontal axes so as to permit the adjustment of the angular inclination of the wheels with respect to the ground and to thereby change the extent of vertical lift imparted to a plant stalk by the gripping wheels for the particular, above ground height of the combine cutting blade. Preferably, the angle of inclination of the wheels is adjusted so that the gripping wheels will lift stalks vertically upwardly a distance substantially equal to the height of the combine cutting blade above the ground. This insures that bean pods lying on the ground or very close to the ground will be elevated to a height where they will be above the cutting level of the combine sickle so as to be conveyed onto the combine receiving platform by the gripping wheels.

As a further important feature of the harvesting attachment, the pivot point for the gripping wheels is located rearwardly of the upwardly extending wheel axles in a direction towards the combine receiving platform in a mounting arrangement which insures that at least a portion of the aforesaid gripping area of the wheels will be located directly over the combine cutting blade for holding a stalk in position for cutting regardless of the angular orientation of the wheels. Preferably, at least a portion of the gripping area is disposed rearwardly of the rearmost cutting edge of the combine blade so that even bent stalks will be properly gripped and held by the wheels for cutting prior to being conveyed onto the receiving platform. By further locating the gripping wheel pivot point directly above the rearmost cutting edge of the cutting blade in vertical alignment therewith, with a portion of the gripping area extending rearwardly of the cutting blade, the proper gripping of bent stalks in position for cutting by the combine blade is assured, regardless of the angular orientation of the gripping wheels.

In order to provide a low profile attachment having no structural or moving components on which entangled vines and branches of plants in adjacent rows could become caught, the aforesaid gripping wheels are rotatably mounted on support brackets secured to relatively short, upright members rigidly attached to the front end of the combine receiving platform with the wheel axles depending downwardly from laterally extending arms of the support brackets and rotatably supporting the wheels directly under the lateral bracket arms. This mounting structure minimizes the height of the attachment on the front end of a combine in contrast with some type of overhead mounting arrangement supported from the combine at a relatively high level.

These and other objects and advantages of my invention will become readily apparent as the following description is read in conjunction with the accompanying drawings wherein like reference numerals have been used to describe like elements throughout the several views.

BRIEF DESCRIPTION OF THE DRAWINGS

FIG. 3 is a top, plan view of the gripping wheel attachment of FIG. 2;

FIG. 4 is a side elevation view of the gripping wheel attachment of FIG. 2; and

FIG. 5 is a vertical, section view taken along lines 5—5 of FIG. 3.

DESCRIPTION OF THE PREFERRED EMBODIMENT

Figure 1:
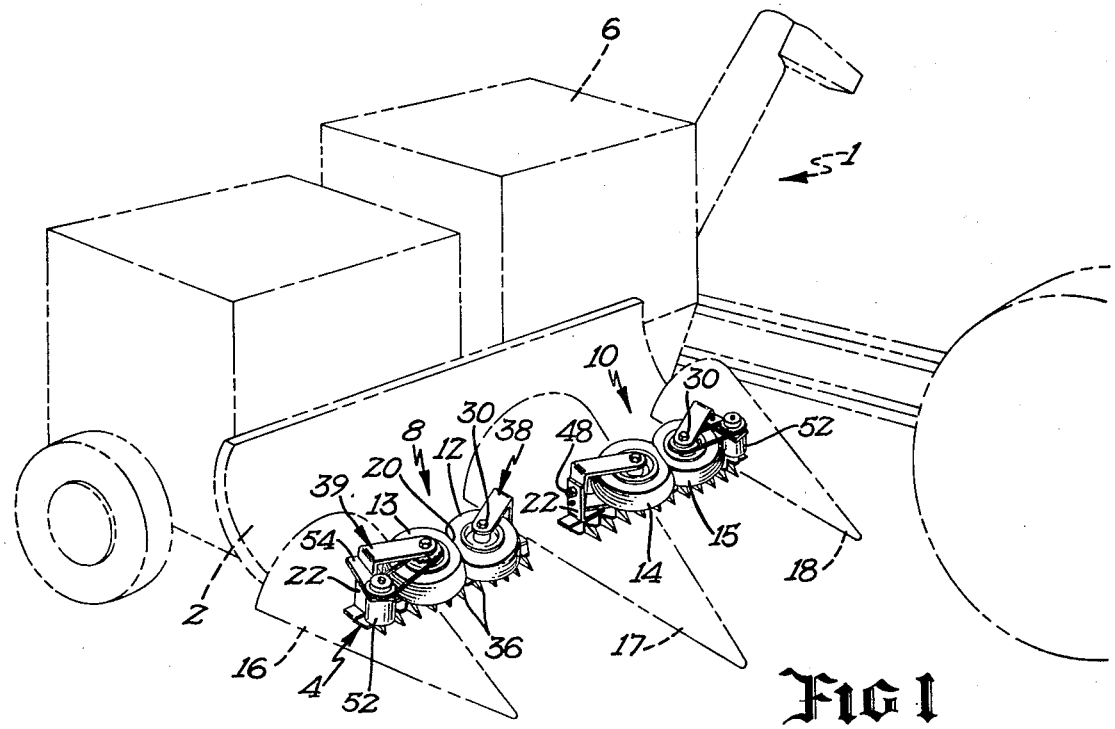
FIG. 1 is a front, perspective view of a combine showing the gripping wheel attachment of this invention mounted thereon.
Figure 2:
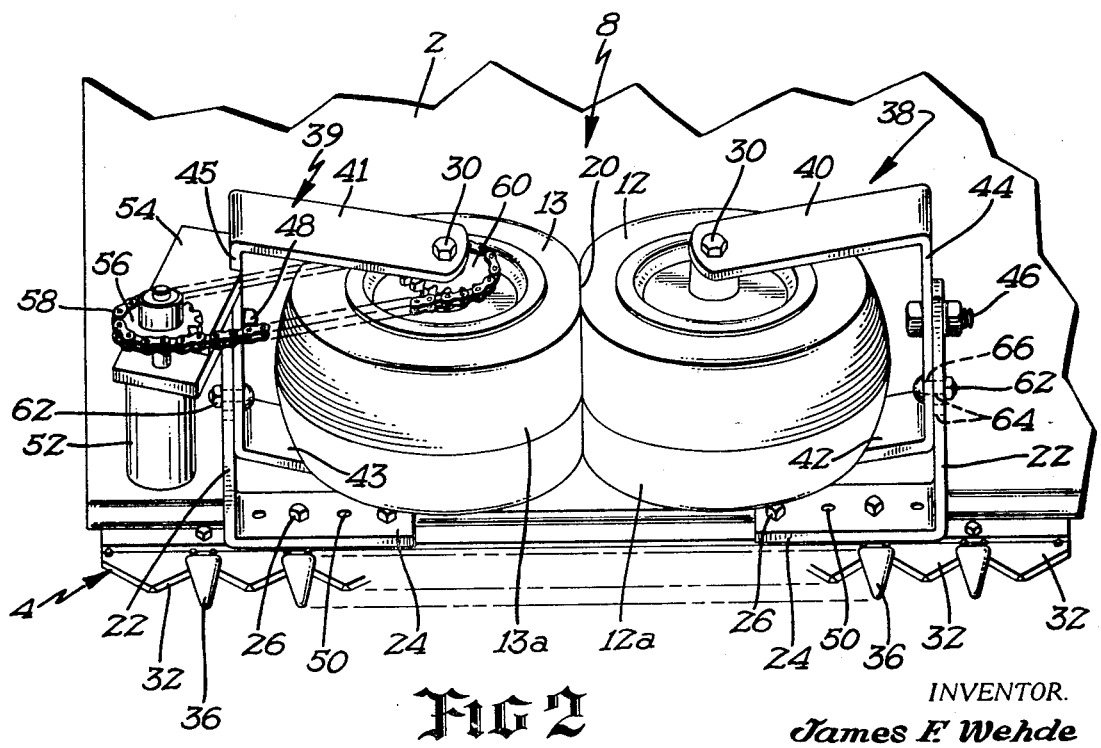
FIG. 2 is a front, elevation view of the attachment structure of FIG. 1 on an enlarged scale and showing only one pair of gripping wheels.

Referring now to the drawings, I have shown in FIG. 1 a combine 1 of conventional design for which my harvesting attachment has been developed. Such combines traditionally incorporate a receiving apron or platform 2 (see FIGS. 3 and 4) and a laterally reciprocal sickle or cutting blade 4 which cuts the stalks of plants being harvested for deposit onto platform 2. An auger or other conveying device is normally utilized to move harvested plant stalks transversely of the platform for conveyance into a separating attachment 6. These operating components of combines are well known, and will not be described herein as they form no part of this invention.

Shown in FIG. 1 are two of the harvesting attachments of this invention 8 and 10 mounted on the front end of receiving platform 2. Each of the attachments is comprised of a pair of gripping wheels 12, 13 and 14, 15. Also mounted on the front end of the combine 1 are three guard housings or dividers 16, 17 and 18 which serve to shield the drive mechanism for the gripping wheels so that plant stalks will not become caught and entangled therein, and which also guide and direct stalks inwardly towards the gripping area or nip 20 between each pair of wheels.

The particular structural arrangement of attachments 8 and 10 on the front end of the combine receiving platform 2 can be best understood by reference to FIGS. 2 through 5 wherein one of the pairs of gripping wheels 8 and its mounting structure are shown. The mounting assembly for gripping wheel attachment 8 includes a pair of upright, laterally spaced mounting plates 22 which are rigidly attached to the front end of combine platform 2 at laterally spaced locations thereon by means of base plates 24 utilizing bolts 26. A rigid cross member 28 is connected between each pair of upright mounting plates 22, as well as to base plates 24 to unitize the attachment for mounting and removal as a unitary assembly. Cross member 28 also serves to fix the lateral spacing between upright mounting plates 22 and thus to define the spacing between the axles 30 of gripping wheels 12 and 13. Base plates 24 are attached to the front end of platform 2 above the inner or rearmost end of sickle or cutting blade 4. The structure of cutting blade 4 is of conventional design, and includes a plurality of teeth or blades 32 attached to a cutting bar 34, teeth 32 being protected by forwardly projecting guards 36 in a known manner. The entire cutting blades or sickle assembly 4 comprised of teeth 32 and cutting bar 34 is laterally reciprocal on platform 2 to achieve a cutting action by a reciprocating mechanism (not shown) of the type conventionally employed on combines. Sickle 4 is mounted a short distance above the ground, at least two inches, as is indicated in FIG. 4.

Wheels 12 and 13 of attachment 8 are held in overlying relation to cutting blade 4 by means of a pair of support brackets 38 and 39, each of which includes a pair of laterally extending, vertically spaced arms 40, 42 and 41, 43 connected together by upstanding bracket plates 44 and 45 defining therewith substantially U-shaped bracket assemblies. Each of the gripping wheels 12 and 13 is rotatably supported between lateral bracket arms 40, 41 and 42, 43 respectively on upstanding axles 30 secured between the vertically spaced bracket arms. Each of the axles 30 depends downwardly from upper bracket arms 40 and 41, and wheels 12 and 13 are mounted thereon directly under upper bracket arms 40 and 41 in closely spaced relation thereto. Upstanding bracket plates 44 and 45 are attached to upright mounting plates 22 by means of pivot bolts 46 and 48 to permit the pivotal adjustment of wheels 12 and 13 about the horizontal axis defined by pivot bolts 46 and 48. It will be apparent that the aforesaid mounting structure for gripping wheels 12 and 13 provides a low profile with no upstanding or vertically extending support elements extending to any significant degree above the top of wheels 12 and 13, laterally extending, upper bracket arms 40 and 41 being the uppermost structural elements of the mounting assembly. By virtue of this profile mounting structure on the front end of the combine, I avoid any overhead or high level support members on which entangled vines of plants in adjoining rows could become caught and entangled.

For reasons hereinafter explained, gripping wheels 12 and 13 are supported on brackets 38 and 39 in an angularly inclined position with respect to the ground with the forward ends of these wheels being lowermost and close to the ground. Wheels 12 and 13 are provided with yieldable peripheral surfaces which are disposed in frictional contact and pressure engagement with each other. For this purpose, the wheels are of the pneumatic type having tire casings 12a and 13a inflated to such a pressure level that the tires will yield under pressure contact in the manner clearly shown in FIG. 3 to define a contact and gripping area 20 of substantial length in a vertical plane. The vertical section view of FIG. 5 is taken along this plane and shows the shape of contact and gripping area 20. The entire attachment assemblies 8 and 10 are laterally adjusted along the front end of receiving platform 2 so as to position wheel nips or gripping areas 20 in direct alignment with the rows of crops being harvested, the spacing between adjacent nips 20 being adjusted to correspond to the distance between adjacent rows of crops. For this purpose, base mounting plates 24 are provided with a plurality of spaced apart apertures 50 extending transversely of receiving platform 2 by means of which each of the harvesting attachments 8 and 10 may be adjustably secured to platform 2 by bolts 26 at predetermined, spaced apart locations.

Although various types of drive means may be employed to impart rotary motion to gripping wheels 12 and 13, I have found it convenient to utilize hydraulic drive motors 52 for this purpose. In accordance with my preferred drive arrangement, one of the hydraulic drive motors 52 is utilized with each of the gripping sheel attachments 8 and 10. Drive motors 52 are supported from a bracket arm 54 welded or otherwise secured to upright wheel bracket plates 45 and projecting forwardly therefrom. As may be noted with respect to the gripping wheel attachment 8 disclosed in FIGS. 2 through 4, the output shaft of hydraulic motor 52 has a drive sprocket 56 mounted thereon around which extends a chain 58 drivingly engaged with a sprocket 60 on axle 30 of wheel 13. The supply and return of hydraulic fluid from motor 52 is handled by flexible fluid lines and connected to a central hydraulic system on a tractor pulling the combine, the hydraulic system and fluid lines not being shown herein. The speed of hydraulic motor 52, and therefore the speed at which the gripping wheels are driven can be adjusted by conventional hydraulic flow control means such as a flow divider. By reason of the frictional engagement of wheels 12 and 13, driven wheel 13 will impart rotary motion to cooperating wheel 12.

Wheels 12 and 13 rotate in opposite directions in the manner shown in FIG. 3, so as to grip the stalks of plants therebetween at the forward end of gripping area 20. By reason of the angular orientation and direction of rotation of wheels 12 and 13, they will exert an upward and rearward pulling force on stalks to convey them over cutting blade 4 for cutting thereby and then discharge the stalks rearwardly onto receiving platform 2. In order to achieve the desired lifting effect of plant stalks prior to cutting of the stalks by sickle 4, wheels 12 and 13 are so mounted with respect to sickle 4 that gripping and contact area 20 extends from a point in front of sickle 4 rearwardly to a rear, terminal point located at least as far rearwardly as the rear end of cutting blade or sickle 4 in overlying relation thereto. Reference is made to FIG. 5 for a clear showing of the position of wheel gripping area 20 with respect to cutting blade or sickle 4. In actual use, I have found that it is desirable to have contact area 20 extend 6 to 7 inches in front of the rear edge of cutting blade 4 so that the desired lifting action of plant stalks can be accomplished before the stalks are cut. Also, it is highly desirable to have at least a portion of contact area 20 extending rearwardly beyond the inner or rear end 4a of cutting blade 4 by a distance of at least one inch. This arrangement of the wheel gripping area with respect to the cutting blade insures that if a stalk is bent forwardly from its point of gripping engagement between wheels 12 and 13, it will still be held tightly between the gripping wheels for proper cutting action when its forwardly bent base portion is engaged by sickle 4.

The aforesaid positioning of wheel gripping and contact area 20 with respect to cutting blade 4 is accomplished by the particular location of pivot bolts 46 and 48 relative to wheel axles 30 and blade 4. As may best be understood by reference to FIGS. 3, 4 and 5, each of the laterally extending wheel bracket arms 40, 41 and 42, 43 angles forwardly from its point of attachment with upright bracket plates 44 and 45. With wheel axles 30 located at the forward end of bracket arms 40, 42 and 41, 43, pivot bolts 46 and 48 securing bracket plates 44 and 45 to upright mounting plates 22 will necessarily be located rearwardly of wheel axles 30 in a direction towards receiving platform 2. Moreover, pivot bolts 46 and 48 are positioned at a location in direct, overlying relation to cutting blade 4. This arrangement of pivot bolts 46 and 48 with respect to both wheel axles 30 and cutting blade 4 accomplishes the desired forward projection of wheel gripping area 20 in front of cutting blade 4 as well as insuring that there will always be at least a portion of gripping area 20 directly above cutting blade 4 to hold a stalk in position for cutting regardless of the angular orientation of gripping wheels 12, 13 and 14, 15 with respect to the ground. This desired orientation of wheel gripping area 20 with respect to cutting blade 4 is further facilitated by locating pivot bolts 46 and 48 substantially midway of the thickness or height of gripping wheels 12, 13 and 14, 15 with the wheels in a horizontal position. The thickness dimension of the wheels to which reference is made here is indicated by dimension X in FIG. 5. Moreover, by locating pivot bolts 46 and 48 so that the horizontal axes which they define will extend through the vertical plane of gripping area 20 as indicated in FIG. 5, with pivot bolts 46 and 48 in substantially direct vertical alignment with the root or base of cutting teeth 32 of blade 4, I am able to accomplish the desired projection of at least a portion of the gripping area 20 rearwardly of cutting blade 4 for the reasons noted above, regardless of the angular orientation of the gripping wheels. The root or base of cutting teeth 32 defines the rearmost cutting edge of sickle or blade 4.

For the purpose of holding gripping wheels 12, 13 and 14, 15 in a predetermined angular position with respect to the ground, I provide releasable locking means in the form of lock bolts 62 and a plurality of spaced apart apertures 64 in upright mounting plates 22. A hole 66 is also provided in upright bracket plates 44 and 45 for receiving lock bolts 62. By removing bolts 62, wheels 12, 13 and 14, 15 may be pivotally adjusted on pivot bolts 46 and 48 to a variety of angular positions. After aligning holes 66 in wheel bracket plates 44 and 45 with one of the holes 64 in upright mounting plates 22, lock bolts 62 are then reinserted to secure the gripping wheels in the desired angular position.

It will be appreciated that the extent of vertical lift imparted to a plant stalk by the gripping wheels will depend upon the length of gripping area 20 from the front to the rear of the wheels within the common plane defined by the wheel contact area, and the angle of inclination of the gripping wheels with respect to the ground. The length of gripping area 20 is predetermined by pressure to which wheels 12, 13 and 14, 15 are inflated. For application on a particular combine, the angular adjustment of the gripping wheels is based upon the height of the combine sickle or blade 4 above ground level. The gripping wheels are pivotally adjusted to a predetermined angle of inclination with respect to the ground in order to provide an amount of vertical lift sufficient to raise the lowest lying pods, such as soybean pods, to a level where they will be cut and harvested by the combine blade. Reference is made to FIG. 5 wherein a number of bean pods are shown at a low lying level where they would normally be below a combine cutting blade or sickle. Thus, in order to harvest the lowest lying bean pods, the gripping wheels will be angularly adjusted so that they will lift the plant stalks to a level at least equal to the height of the sickle or cutting blade 4 above ground level.

Because the combine 1 on which harvesting attachments 8 and 10 are mounted will, of course, be moving forwardly, the rotational speed of gripping wheels 12, 13 and 14, 15 must be synchronized with the forward speed of the combine or harvesting machine in order to be sure that the desired, predetermined lift has been imparted to stalks and that the stalks are still being held in position for cutting when the sickle or cutting blade 4 reaches the stalks. For this purpose, the flow of hydraulic fluid to hydraulic drive motors 52 is adjusted to achieve a predetermined rotational speed of the gripping wheels. In operation, the rotational speed of each set of gripping wheels is such that they will impart a predetermined vertical lift to a plant stalk and will operate to hold a lifted stalk within gripping area 20 as the cutting blade or sickle 4 of the combine reaches the stalk and severs it from its roots. With the angle of inclination of the gripping wheels set to achieve a lift equal to the elevation of the combine cutting blade above the ground, each plant stalk will be severed substantially at its base where it joins its roots as it is held at the rear of gripping area 20. The continued rotation of gripping wheels 12, 13 and 14, 15 will throw each severed stalk onto receiving platform 2 after the cutting operation by sickle 4. Preferably, the speed of the gripping wheels is adjusted with respect to the ground speed of the combine so that the horizontal component of rearward movement imparted to stalks will substantially equal the forward movement of the combine. Thus, with the forward end of gripping area 20 disposed in front of cutting blade or sickle 4, the rearward, horizontal component of movement of the stalks and the forward movement of the cutting blade 4 after engagement of a stalk by the gripping wheels, will cancel each other, with the net effect being vertical, upright lifting of each plant stalk with the predetermined, maximum lift having been imparted to each stalk and the stalk being held at the rear of gripping area 20 just as it is reached and cut by sickle 4.

Those skilled in the art will appreciate that my harvesting attachment as described and shown herein accomplishes the important result of harvesting all of the fruit or desired crop products, such as soybean pods, which are normally located so low on a plant stalk as to be below a combine sickle or cutting blade. Although I have shown and described my harvesting attachment with respect to particular, preferred embodiments thereof, I contemplate that various changes may be made in the size, shape and construction of the various component parts without departing from the spirit and scope of my invention as defined by the following claims.

I claim:

1. On a harvesting machine having a receiving platform and a cutting blade attached to the front end thereof in proximity to the ground for cutting movement transverse to the direction of travel of the machine, a harvesting attachment for row crops comprising:

a pair of upright, laterally spaced mounting members rigidly attached to the front end of said platform in opposed relation to each other;

a wheel support bracket secured to each of said upright members, each of said support brackets including an arm extending laterally with respect to said receiving platform and generally normal to one of said mounting members at an elevation above said cutting blade, said arms being the uppermost structural elements of the harvesting attachment;

an axle secured to each of said bracket arms and depending downwardly therefrom;

a pair of stalk-gripping wheels rotatably mounted on said axles and supported from said bracket arms directly thereunder in closely spaced relation thereto in an angularly inclined position with respect to the ground with the forward ends of said wheels being lowermost and close to the ground, and said wheels having yieldable peripheral surfaces in pressure contact with each other along a common plane defining a contact and gripping area positioned between said wheels in alignment with a row of crops being harvested, said gripping area extending rearwardly from a point forwardly of said cutting blade to a rear, terminal point located at least as far rearwardly as the rear end of said cutting blade in overlying relation thereto; and drive means connected to at least one of said wheels for supplying rotary power thereto, said wheels rotating together in opposite directions so as to grip the stalks of plants therebetween at the forward end of said gripping area and to exert an upward and rearward pulling force on stalks to convey them over said blade for cutting thereby from their roots and thence onto said receiving platform.

2. A harvesting machine and attachment as defined in claim 1, and further including:

a second harvesting attachment including a second pair of gripping wheels rotatably mounted on a second pair of wheel support brackets secured to a second pair of upright; laterally spaced mounting members rigidly attached to the front end of said platform in laterally spaced relation to said pair of upright mounting members;

a rigid cross member connected between each pair of said upright mounting members, thereby fixing the spacing between the axles of each pair of gripping wheels; and base plate means rigidly attached to each of said upright mounting members, said base plate means having a plurality of spaced apart apertures therein extending transversely of said receiving platform by means of which each of said harvesting attachments is adjustably secured to said receiving platform by fasteners at predetermined, spaced apart locations thereon such that the gripping areas between said pairs of gripping wheels will be spaced apart by a distance corresponding to the distance between rows of crops being harvested.

3. On a harvesting machine having a receiving platform and a cutting blade attached to the front end thereof in proximity to the ground for cutting movement in a direction transverse to the direction of travel of the machine, a harvesting attachment comprising:

a pair of laterally spaced, stalk-gripping wheels rotatably mounted on a pair of wheel support brackets secured to the front end of said receiving platform, said wheels being supported in an angularly inclined position with respect to the ground with the forward ends of said wheels being lowermost and close to the ground, and said wheels having yieldable peripheral surfaces in pressure contact with each other along a common plane defining a contact and gripping area positioned between said wheels in alignment with a row of crops being harvested, said gripping area extending from a point in front of said cutting blade rearwardly over said cutting blade;

a pair of laterally spaced mounting members rigidly attached to the front end of said platform in opposed relation to each other, said wheel support brackets being pivotally mounted on said mounting members for pivotal movement about horizontal axes to permit the adjustment of the angular inclination of said wheels with respect to the ground to thereby change the extent of vertical lift imparted to a stalk by said gripping wheels, said wheel support brackets being so mounted on said mounting members and said horizontal axes being so located that at least a portion of said gripping area between said wheels is disposed over said cutting blade at all angular positions of adjustment of said wheels; and drive means connected to one of said wheels for supplying rotary power thereto, said wheels rotating together in opposite directions so as to grip the stalks of plants therebetween at the forward end of said gripping area and to exert an upward and rearward pulling force on stalks to convey them onto said receiving platform, said drive means being adjusted to rotate said wheels at a predetermined speed synchronized with ground speed of said harvesting machine so that said gripping wheels will impart a predetermined lift to a plant stalk and will operate to hold a lifted stalk at the rear of said gripping area over said cutting blade with the base of said stalk at a predetermined elevation with respect thereto just as said cutting blade reaches the stalk and severs it from its roots.

4. A harvesting machine and attachment as defined in claim 3 wherein:

said gripping area between said wheels extends rearwardly to a point at least one inch rearwardly of the rearmost cutting edge of said cutting blade.

5. On a harvesting machine having a receiving platform and a cutting blade attached to the front end thereof in proximity to the ground, a harvesting attachment for row crops comprising:

a pair of laterally spaced mounting members rigidly attached to the front end of said platform in opposed relation to each other;

a wheel support bracket pivotally secured to each of said mounting members on a pivotal connection defining a horizontal axis about which said wheel support brackets may be pivoted;

an axle secured to each of said wheel support brackets at an angularly inclined position with respect to the ground;

a pair of stalk-gripping wheels rotatably mounted on said axles and supported from said wheel brackets in an angularly inclined position with respect to the ground with the forward ends of said wheels being lowermost and close to the ground, and said wheels having yieldable peripheral surfaces in pressure contact with each other along a common plane defining a contact and gripping area positioned between said wheels in alignment with a row of crops being harvested, said gripping area extending from a point in front of said cutting blade rearwardly over said cutting blade with a portion thereof positioned above said cutting blade;

drive means connected to one of said gripping wheels for supplying rotary power thereto, said wheels rotating together in opposite directions so as to grip the stalks of plants therebetween at the forward end of said gripping area and to exert an upward and rearward pulling force on stalks to convey them over said blade to a position at the rear of said gripping area where a stalk is held between said gripping wheels and severed from its roots by said cutting blade and thence conveyed onto said receiving platform by said gripping wheels; and releasable means for holding said wheel support brackets in a predetermined position of pivotal adjustment on said mounting members, whereby said gripping wheels may be adjusted to a predetermined angular position with respect to the ground so as to impart a desired vertical lift to stalks prior to cutting of the stalks from their roots by said cutting blade, said pivotal connection being so located with respect to said cutting blade and said wheels that at least a portion of said gripping area of said wheels is positioned over said cutting blade at all angular positions of adjustment of said wheels.

6. A harvesting machine and attachment as defined in claim 5 wherein:

at least a portion of said gripping area is disposed rearwardly of the rearmost cutting edge of said cutting blade when said gripping wheels are positioned in an angularly inclined position of use.

7. A harvesting machine and attachment as defined in claim 5 wherein:

said pivotal connection of said wheel support brackets to said upright mounting members is located rearwardly of said gripping wheel axles in a direction towards said receiving platform.

8. A harvesting machine and attachment as defined in claim 7 wherein:

each of said wheel support brackets includes an upright bracket plate attached to one of said upright mounting members by said pivotal connection, and a lateral bracket arm extending forwardly from said upright bracket plate and having one of said axles secured thereto at a location in front of said pivotal connection, whereby said pivotal connection will be positioned rearwardly of said wheel axles.

9. A harvesting machine and attachment as defined in claim 5 wherein:

said pivotal connection is positioned directly above said cutting blade in vertical alignment with some portion thereof, and said horizontal axis defined by said pivotal connection extends through said gripping area of said wheels.

10. A harvesting machine and attachment as defined in claim 9 wherein:

said horizontal axis defined by said pivotal connection extends through a rearwardly disposed portion of said gripping area of said wheels.

11. A harvesting machine and attachment as defined in claim 5 wherein:

the angle of inclination of said gripping wheels with respect to the ground and the length of said contact and gripping area along a line lying in said common plane are predetermined values such that said gripping wheels will lift stalks vertically upwardly a distance substantially equal to the height of said cutting blade above the ground.

12. On a harvesting machine having a receiving platform and a cutting blade attached to the front end thereof in proximity to the ground for cutting movement transverse to the direction of travel of the machine, a harvesting attachment for row crops comprising:

a pair of upright, laterally spaced mounting members rigidly attached to the front end of said platform in opposed relation to each other;

a wheel support bracket secured to each of said upright members, each of said support brackets being comprised of a pair of laterally extending, vertically spaced arms connected together by an upstanding plate defining therewith a substantially U-shaped bracket assembly, each of said upright plates being secured to one of said upright mounting members, and each of said gripping wheels is rotatably supported between a pair of said lateral bracket arms on an axle secured therebetween, each of said axles depending downwardly from the uppermost one of said lateral bracket arms;

a pair of stalk-gripping wheels rotatably mounted on said axles and supported from said bracket arms directly thereunder in closely spaced relation thereto in an angularly inclined position with respect to the ground with the forward ends of said wheels being lowermost and close to the ground, and said wheels having yieldable peripheral surfaces in pressure contact with each other along a common plane defining a contact and gripping area positioned between said wheels in alignment with a row of crops being harvested, said gripping area extending rearwardly from a point forwardly of said cutting blade to a rear, terminal point located at least as far rearwardly as the rear end of said cutting blade in overlying relation thereto; and drive means connected to at least one of said wheels for supplying rotary power thereto, said wheels rotating together in opposite directions so as to grip the stalks of plants therebetween at the forward end of said gripping area and to exert an upward and rearward pulling force on stalks to convey them over said blade for cutting thereby from their roots and thence onto said receiving platform.

13. On a harvesting machine having a receiving platform and a cutting blade attached to the front end thereof in proximity to the ground for cutting movement transverse to the direction of travel of the machine, a harvesting attachment for row crops comprising:

a pair of upright, laterally spaced mounting members rigidly attached to the front end of said platform in opposed relation to each other;

a wheel support bracket secured to each of said upright members, each of said support brackets including an arm extending laterally with respect to said receiving platform and an upstanding bracket plate connected to one of said laterally extending bracket arms and pivotally secured on one of said upright mounting members for pivotal movement about a substantially horizontal axis, whereby each of said wheel support brackets may be pivotally adjusted to position each of said gripping wheels at a predetermined angularly inclined position with respect to the ground to thereby adjust the extent of vertical lift imparted to stalks by said gripping wheels as they rotate;

an axle secured to each of said bracket arms and depending downwardly therefrom;

a pair of stalk-gripping wheels rotatably mounted on said axles and supported from said bracket arms directly thereunder in closely spaced relation thereto in an angularly inclined position with respect to the ground with the forward ends of said wheels being lowermost and close to the ground, and said wheels having yieldable peripheral surfaces in pressure contact with each other along a common plane defining a contact and gripping area positioned between said wheels in alignment with a row of crops being harvested, said gripping area extending rearwardly from a point forwardly of said cutting blade to a rear, terminal point located at least as far rearwardly as the rear end of said cutting blade in overlying relation thereto; and drive means connected to at least one of said wheels for supplying rotary power thereto, said wheels rotating together in opposite directions so as to grip the stalks of plants therebetween at the forward end of said gripping area and to exert an upward and rearward pulling force on stalks to convey them over said blade for cutting thereby from their roots and thence onto said receiving platform.

* * * * *